(No Model.)

M. M. CLARK.
GALVANIC BATTERY.

No. 479,786. Patented Aug. 2, 1892.

Witnesses:
George L. Cragg.
George McMahon.

Inventor:
Martin M. Clark.
by Barton + Brown,
Attys

UNITED STATES PATENT OFFICE.

MARTIN M. CLARK, OF CHICAGO, ILLINOIS, ASSIGNOR TO THE WESTERN ELECTRIC COMPANY, OF SAME PLACE.

GALVANIC BATTERY.

SPECIFICATION forming part of Letters Patent No. 479,786, dated August 2, 1892.

Application filed January 9, 1892. Serial No. 417,443. (No model.)

*To all whom it may concern:*

Be it known that I, MARTIN M. CLARK, a citizen of the United States, residing at Chicago, in the county of Cook and State of Illinois, have invented a certain new and useful Improvement in Galvanic Batteries, of which the following is a full, clear, concise, and exact description, reference being had to the accompanying drawings, forming a part of this specification.

My invention relates to the construction of galvanic batteries, and more especially to that class of batteries in which the complete cell is sealed, generally known as the "dry" battery.

Its object is to provide simple and effective means whereby an exhausted cell may be replenished with fresh electrolyte without unsealing it.

My invention is employed in connection with the positive element of that class of batteries in which this element is constructed in the form of a cup adapted to surround and contain the negative element and the electrolyte; and it consists in a short tube or tubes fastened to or constructed integral with the cup-shaped element extending downward to the electrolyte and projecting above the sealed surface of the cell. The projecting end of the tube is closed by a screw cap or plug. By unscrewing the cap from the tube an opening is provided for the introduction of electrolyte or water.

My invention is illustrated in the accompanying drawings, in which—

Figure 1:
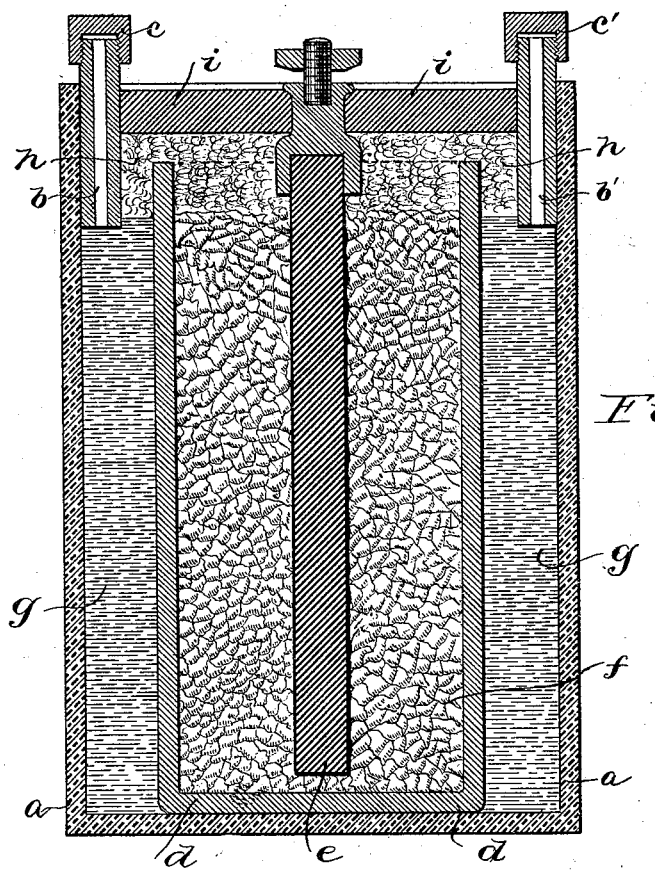
Figure 2:
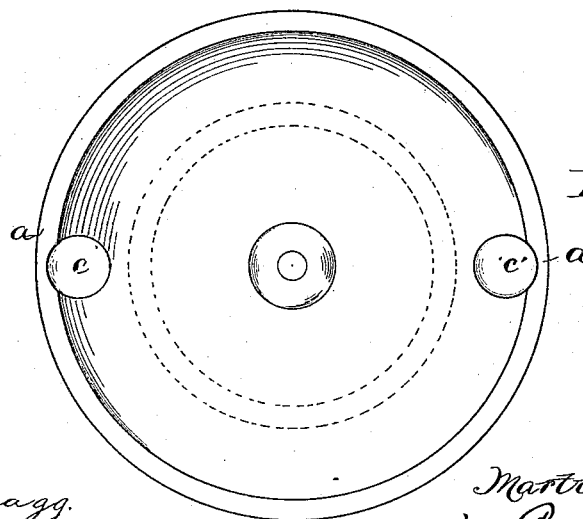

Figure 1 is a vertical section through the center of a cell constructed in conformity with my invention, and Fig. 2 is a plan thereof.

Referring to the figures, $a$ is the cup-shaped positive element.

$b\ b'$ are two tubes, as described, fastened to the inner surface of the cup.

$c\ c'$ are two screw-caps closing the tubes $b\ b'$.

Inside the cup $a$ is placed the porous earthenware cup $d$, containing the negative element $e$ and the depolarizing mixture $f$. The annular space between the porous cup and the positive element is nearly filled with the electrolyte $g$, which may be in either moist or fluid form. Above the electrolyte, in the remaining space between the cups, is placed a layer of some fibrous material $h\ h$, as oakum. The complete cell is sealed by a layer of pitch or wax $i\ i$. The tubes $b\ b'$ open slightly below the layer $h\ h$ of oakum, and hence are in communication with the space occupied by the electrolyte. These tubes $b\ b'$ are preferably made from the same material as that of the positive element—usually zinc—in order to avoid local action between the positive element and the tubes. The caps $c\ c'$ may be of any suitable material, either non-metallic, as hard rubber or vulcanized fiber, or metallic; but when the latter they should be of the same metal as the tubes.

Obviously my invention is not confined to use in connection with any particular form of negative element.

Having thus fully described my invention, I claim as new and desire to secure by Letters Patent—

In an electric battery, the combination, with a cup-shaped positive element adapted to surround and inclose the electrolyte and negative element, of a porous cup immersed in said electrolyte, a negative element within said porous cup and surrounded by a depolarizing substance, a packing of fibrous material above the electrolyte, a suitable sealing material adapted to close the battery, and a tube secured to the positive element and extending through the sealing and packing material to the electrolyte, said tube being provided with a removable closing-cap, substantially as described.

In witness whereof I hereunto subscribe my name this 13th day of August, A. D. 1891.

MARTIN M. CLARK.

Witnesses:
F. R. MCBERTY,
GEORGE L. CRAGG.